United States Patent
Singh et al.

(10) Patent No.: US 7,103,067 B1
(45) Date of Patent: Sep. 5, 2006

(54) MECHANISM FOR TRANSLATING BETWEEN TWO DIFFERENT VOICE-OVER-IP PROTOCOLS

(75) Inventors: Hemant Singh, North Andover, MA (US); William G. Guckel, Somers, CT (US)

(73) Assignee: Cisco Technology, Inc., San Jose, CA (US)

( * ) Notice: Subject to any disclaimer, the term of this patent is extended or adjusted under 35 U.S.C. 154(b) by 941 days.

(21) Appl. No.: 10/026,273

(22) Filed: Dec. 21, 2001

(51) Int. Cl.
*H04J 3/22* (2006.01)
*H04L 12/66* (2006.01)

(52) U.S. Cl. ................................. 370/467; 370/353
(58) Field of Classification Search ............ 370/352, 370/353, 466–7
See application file for complete search history.

(56) References Cited

U.S. PATENT DOCUMENTS

| | | | |
|---|---|---|---|
| 5,764,750 A * | 6/1998 | Chau et al. | 379/229 |
| 5,809,028 A * | 9/1998 | Nethercott et al. | 370/467 |
| 5,852,660 A * | 12/1998 | Lindquist et al. | 379/230 |
| 6,084,887 A * | 7/2000 | Salisbury et al. | 370/467 |
| 6,151,390 A * | 11/2000 | Volftsun et al. | 379/229 |
| 6,888,803 B1 * | 5/2005 | Gentry et al. | 370/259 |
| 6,917,610 B1 * | 7/2005 | Kung et al. | 370/352 |
| 6,977,911 B1 * | 12/2005 | Geen et al. | 370/328 |

OTHER PUBLICATIONS

PKT-SP-CMSS-I01-001128, PacketCable CMS to CMS Signaling Specification, CableLabs, pp. 9-18, Nov. 28, 2000.*

PacketCable™ Dynamic Quality-of- Service Specification, *PKT-SP-DQOS-I02-000818*, Interim, © Copyright 1999,2000, Cable Television Laboratories, Inc.

PDF Formatted document entitled: *PacketCable™ Distributed Call Signaling Specification*, Available at Website ftp://ftp.cablelabs.com/pub/.

Handley et al., *SIP: Session Initiation Protocol*, Network Working Group, Request for Comments: 2543, Category: Standards Track, Copyright © The Internet Society (1999). All Rights Reserved.

Rosenberg et al., *Reliability of Provisional Responses in SIP* Internet Engineering Task Force Internet Draft, draft-ietf-sip-100rel-03.txt, Mar. 2, 2001, Expires: Sep. 2001.

F. Haerens, *Third Party Call Control for Resource Management*, SIP Working Group, Internet Draft, Document: <draft-haerens-sip-3pcc-00.txt>, Category: Informational, Feb. 2001.

* cited by examiner

*Primary Examiner*—Chau Nguyen
*Assistant Examiner*—Kerri M. Dyke
(74) *Attorney, Agent, or Firm*—Beyer Weaver & Thomas, LLP

(57) ABSTRACT

Disclosed are methods and apparatus for translating data within a cable network between a first voice-over-IP (VOIP) protocol used by a user agent and a second VOIP protocol used by a call management server, or other type of call receiver. In one embodiment, data from an SIP (Session Initiation Protocol) user agent is translated for an NCS (Network Call Signaling) call management server. In one implementation, translation mechanisms are provided within the customer premises equipment in which the respective user agent is also configured.

40 Claims, 4 Drawing Sheets

MECHANISM FOR TRANSLATING BETWEEN TWO DIFFERENT VOICE-OVER-IP PROTOCOLS

BACKGROUND OF THE INVENTION

The present invention relates to methods and apparatus for processing voice over IP (VOIP) related messages within a broadband network, particularly a cable data network. More specifically, it relates to mechanisms for allowing a telephony service provider's network to be extended into a subscriber's home network providing voice over a packet switched network (e.g., the Internet).

Broadband access technologies such as cable, DSL, fiber optic, and wireless have seen a rapid adoption in recent years. Both the higher data rate and the 'always on' capability provided by broadband make it possible for an Internet service provider to deploy new applications/services. One of these applications is the traditional voice service offered by the public switched telephone network Recently, due in part to US deregulation of the telecommunications industry, ISPs (Internet Service Providers) have made great progress in deploying the hardware and software technologies required to support VOIP. Providing a telephony service over an IP infrastructure poses many challenges, not the least of which is the need to insure that the voice quality provided by this service is comparable with that of the PSTN (Public Switched Telephone Network). For networks that use a shared access medium to communicate between subscribers and the service provider (e.g., cable networks, wireless networks, etc.), the task of providing this reliable high-quality voice (and possibly video) communication is even more challenging. Further data networks are packet networks unlike the legacy PSTN telephony that is circuit switched. For a circuit switched network, there is fixed delay and ordered data transmission that leads to toll quality voice that is what one has today in the PSTN. A packet network has non linear delay, and audio packets get re ordered during transmission on the wire. Such properties of a packet network makes quality of service (QoS) a very important goal for VOIP telephony.

One type of broadband access technology relates to cable data networks. A cable network or "cable plant" employs cable modems, which are an improvement over conventional dialup PC data modems and provide virtually continuous, high speed connectivity. Cable modems are a good example of broadband customer access equipment that are instrumental in enhancing the broadband access network so that a service provider can deploy voice, video and data telecommunications services.

Currently (in the US) there are two main VOIP signaling protocols (NCS and SIP) that are being using by telephony service providers (TSP) in the deployment of their service. The customer premise device (e.g., residential gateway) speaks one of these signaling protocols in order to allow the user (usually via a 'black phone') to send and receive phone calls. However, the user may wish to use a different application/device than the one provided. Furthermore, this device may not implement the same signaling protocol as the one used by the TSP.

Unfortunately, since the components of the telephony service network, especially the user authentication and billing components that doles out QoS for the VOIP call, will be configured to implement the selected industry standard, users cannot currently use their alternative applications which use a non-standard protocol with their telephony service.

Accordingly, there is a need for mechanisms for allowing a VOIP user to utilize a communication protocol, such as SIP, that differs from the cable industry standard (e.g., NCS). Additionally, it would be desirable to provide the same voice quality to the user regardless of the device used to send or receive a particular phone call. Preferably, this is done without mandating the use of service RSVP (Resource Reservation Protocol) since this mechanism has not yet been widely adopted.

SUMMARY OF THE INVENTION

Accordingly, the present invention provides methods and apparatus for translating VOIP communication protocols between the telephony service provider and the customer premise equipment into the different VOIP protocols utilized by the customer's telephone application (e.g. a personal computer application program). In one implementation, communications from an SIP (Session Initiation Protocol) user agent are translated at the CPE (e.g., a cable modem) into the communications expected by an NCS (Network Call Signaling) call management server.

In one embodiment, a method for translating communication data within a call endpoint system in a cable network. Within a first call endpoint system, a first data sent by a first user agent to a second user agent is received. The first data uses a first communication protocol. The first user agent forms part of the first call endpoint system, and the second user agent forms part of a second call endpoint system. Within the first call endpoint system, one or more second data transaction(s) are initiated with one or more intermediary cable components within the cable network based on such first data. The second data uses a second communication protocol that is also utilized by the one or more cable components. The one or more intermediary cable components are configured to send one or more third data based on the second data or other data sent by the first agent to the second user agent. One of the first or second call endpoint systems is an originator of a particular call, and the other of the first and second call endpoint system is a terminator of the particular call, wherein the first and second data forms part of the particular call.

In one specific embodiment, the first protocol is Session Initiation Protocol (SIP) and the second protocol is the Network-based Call Signaling (NCS) protocol. In one specific implementation, the first data is an INVITE message and the second data transaction(s) includes a NTFY(digits) message. In another implementation, the first data is a BYE message and the second data transaction(s) includes a NTFY (OnHook) message. In yet another implementation, the first data is an "183 SDP" message and the second data transaction(s) includes a DSA-REQ message.

In a further embodiment, within the first call endpoint system, a fourth data sent from the one or more intermediary cable components to the first user agent is received. The fourth data uses the second protocol. When the fourth data requires a response, a response is sent to the one or more intermediary cable components. The response uses the second protocol. Within the first call endpoint system, one or more fifth data transaction(s) are initiated with the first user agent based on the fourth data. The fifth data uses the first protocol.

In one implementation, the fourth data is a CRCX message and the fifth data transaction(s) includes an INVITE message. In another implementation, the fourth data is an MDCX message and the fifth data transaction(s) includes an "183 SDP" message. In yet another aspect, the fourth data is an DSC-ACK message and the fifth data transaction(s) includes an "180 Ring" message. In another embodiment, the fourth data is an DSD-RSP message and the fifth data transaction(s) includes an "200 OK" message when the first user agent has previously sent a BYE message.

In another embodiment, the invention pertains to a computer system operable to translate communication data within a call endpoint system in a cable network. The computer system includes one or more processors and one or more memory. At least one of the memory and processors are adapted to provide at least some of the above described method operations. In yet a further embodiment, the invention pertains to a computer program product for translating communication data within a call endpoint system in a cable network. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
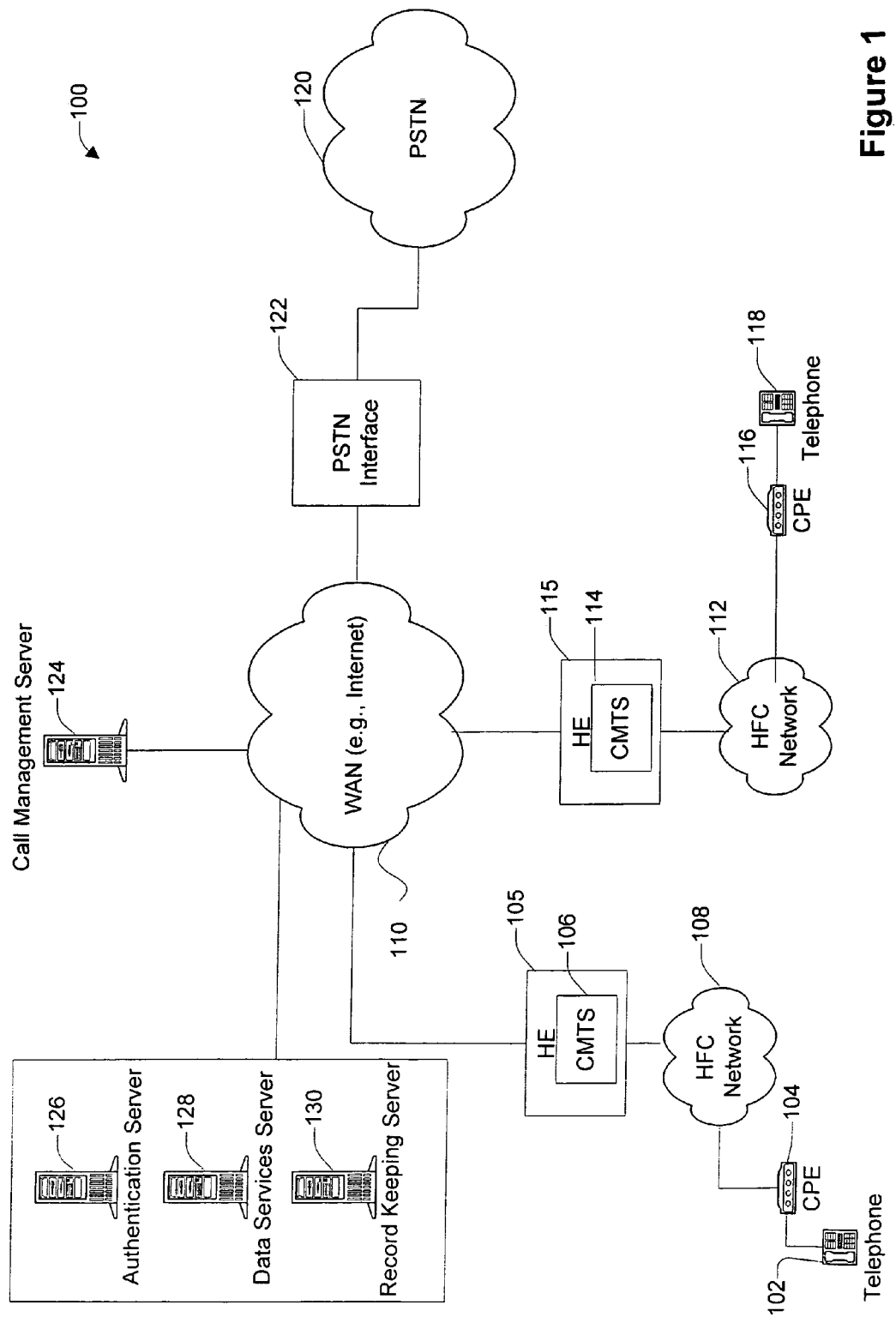
FIG. 1 is a diagrammatic representation of a computer network in which the present invention may be implemented.

FIG. 1 shows a block diagram of a network 100 in which the present invention may be implemented. As shown, the network 100 includes a first telephone 102 coupled to customer premise equipment (CPE) 104 and a second telephone 118 coupled to CPE 116. The telephones may be in the form of soft telephones within a computer system (e.g., personal computer or PC), and each CPE may be in the form of a set top box or a cable modem coupled to the computer system or integrated within such computer system. In a specific embodiment, each CPE includes receptacles into which physical telephones may be plugged.

Users at each telephone 102 and 118 may communicate with each other through their respective hybrid fiber coaxial (HFC) networks 108 and 112, head end (HE) complexes 105 and 115, and wide area data network, such as the Internet. The telephones 102 and 118 may also be in the same HFC network, using the same HE complex. The HE complexes 105 and 115 are each typically configured to service about 40,000 homes. The HE complexes 105 and 115 each may include a plurality of components and/or systems (not shown) such as, for example, a Head End, a super Head End, a hub, a primary hub, a second hub, etc. Additionally, the HE complexes 105 and 115 each typically include a Cable Modem Termination System (CMTS), e.g., 106 and 114. Primary functions of the CMTS include (1) receiving data inputs from external sources and converting the data for transmission over the cable plant; (2) providing appropriate Media Access Control (MAC) level packet headers for data received by the cable system, and (3) modulating and demodulating the data to and from the cable network. Typically, the HE complexes 105 and 115 are each configured to provide a communication interface between nodes (e.g. CPE's or cable modems) in the cable network and external networks such as, for example, the Internet 110.

In order for data to be able to be transmitted effectively over a wide area network such as an HFC network or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, DOCSIS 1.1 RF Interface Specification (document control number SP-RFIv1.1-I06-001215, Dec. 15, 2000). This document is incorporated herein by reference for all purposes.

In the present invention, the network 100 also includes components for implementing voice over a packet switched telephone network (PSTN) 120 or voice over Internet (VOIP) applications so that, for example, a user at telephone 102 may communicate with a user of telephone 118. Each of these users may also communicate with other users on the PSTN 120. As shown, the network 100 includes call management server (CMS) 124 for routing and placing calls or voice data over the Internet. The CMS 124 may also be configured to authorize calls. In conventional cable network systems, the CMS 124 implements the NCS protocol.

The network 100 may also include one or more servers for providing service configurations (Data Service Server 128), providing book keeping and billing for calls (Record Keeping Server 130), and granting/authorizing calls (Authentication Server 126). The network 100 may also include a PSTN (Public Switched Telephone Network) interface 122 for converting between IP packets and PSTN voice. The network may also include additional components (not shown) for performing various voice related tasks, such as encryption, wire tapping, and voice mail management.

Some or all of the components within the cable network may be configured to implement the current cable industry standard protocol, the Network-based Call Signaling (NCS) protocol. In one embodiment, each CPE, HE and CMTS, the CMS 124, and Record Keeping Server 130 may be configured to implement NCS. In contrast, each end point of a call placed within such network (e.g., user's computer system or CPE) may be configured with an application that uses a different voice protocol, such as an Session Initiation Protocol (SIP) User Agent of a soft phone application. In one embodiment, the present invention includes mechanisms for translating between an SIP User Agent and NCS client protocol. In general terms, the translation mechanisms are provided within a call endpoint system. A call endpoint system may be an originator of a particular call or a terminator of a particular call. In one embodiment, the CPE 104 may be configured to translate between an SIP User Agent and another NCS component within the cable network, such as the CMS 124. In an alternative embodiment, mechanisms are provided for translating between an NCS User Agent and an SIP client protocol or another SIP component within the cable network.

In general terms, the translation mechanism translates voice messages initiated by an SIP User Agent into NCS Residential GateWay (RGW, or NCS client) messaging patterns required by the various NCS implementing components within the network 100 for the particular type of call initiated by the SIP User Agent. Additionally, these translation mechanisms translate NCS messages received from an NCS component within the network 100 into SIP messages required by an SIP User Agent. These translation mechanisms may be provided in any component that sits between the SIP User Agent and the first or next NCS component within the network that receives messages from an SIP User Agent. For example, translation mechanisms may be provided within a set top box, cable modem or embedded multimedia terminal or within the same computer system in which the SIP-User Agent is configured. In the illustrated embodiment, each CPE also includes translation mechanisms for translating from SIP to NCS for voice data or messages going out of the CPE and for translating from NCS to SIP for voice data or messages going into the CPE.

These translation mechanisms may be provided for translating between any messages used to establish a feature of SIP and a corresponding feature of NCS. However, when a particular feature within either SIP or NCS does not have a corresponding feature in the other protocol NCS or SIP, this feature is simply not implemented for the other protocol messages. That is, every feature of a particular protocol may not be translated into a corresponding feature in the other protocol. Additionally, every feature of each protocol SIP and NCS has not been described herein since one skilled in the art could easily incorporate translation mechanisms for each feature into the translation mechanisms described herein.

Figure 2:
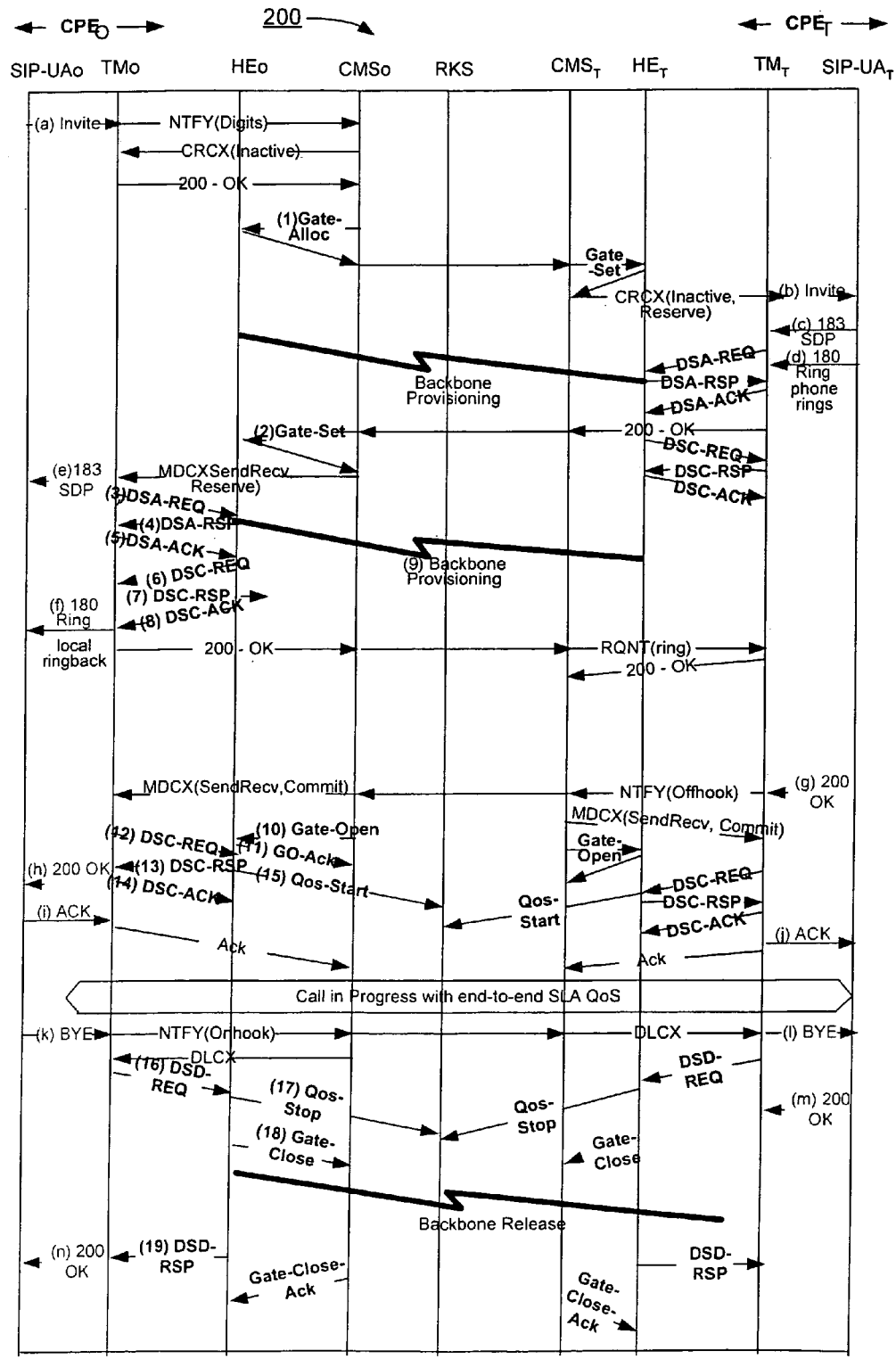
FIG. 2 is a communication diagram showing an example procedure for translating between the SIP (Session Initiation Protocol) and the NCS (Network-based Call Signaling) messages used for establishing and dismantling a particular call, where SIP is implemented by the User Agents of such call, in accordance with one embodiment of the present invention.

FIG. 2 is a communication diagram 200 showing an example procedure for translating between the SIP and the NCS messages used for establishing and dismantling a particular call, where SIP is implemented by the user agents of such call, in accordance with one embodiment of the present invention. The subscript "O" correlates with the originator of the call, and the subscript "T" correlates with the terminations of such call. Different SIP messages are distinguished by different alphabetic symbols, and different NCS messages are distinguished by different numeric symbols. In the illustrated example, SIP type messages are sent between the SIP-UA$_O$ and the translation mechanism TM$_O$ within CPE$_O$. Likewise, SIP type messages are sent between the SIP-UA$_T$ and the translation mechanism TM$_T$ within CPE$_T$. The CPE$_O$ and CPE$_T$ are each configured to communicate with other network components (e.g., external components) using NCS messaging, which is well known to those skilled in the art. At least a portion of the NCS messaging output from a CPE is triggered by one or more specific SIP messages from a respective SIP-UA. Likewise, specific well known SIP messages received into a SIP-UA are triggered by one or more specific NCS messages. In an alternative implementation, translation mechanisms may also only be provided in the CPE of one end of a particular call. For example, the originator User Agent implements SIP, while the terminator User Agent implements NCS.

In the illustrated embodiment, a call originator SIP User Agent (SIP-UA$_O$) initiates a call to a call terminator SIP User Agent (SIP-UA$_T$) with an SIP "INVITE" message (a) asking the user associated with SIP-UA$_T$ to join the call. The originator translation mechanism (TM$_O$) then initiates a number of NCS messages to various NCS configured components within the network to establish the call, authorize the call, and initiate quality of service (QoS). The NCS messages required for these functions are well known to those skilled in the art.

As shown, the TM$_O$ initiates an NCS three-way handshake with the originator CMS$_O$ to establish the call. That is, the TM$_O$ sends an NCS "NTFY(digits)" message which includes the phone number of the telephone being called to a call management server associated with the originator (CMS$_O$). The "NTFY(digits)" indicates that a phone number has been entered by the user (e.g., via a keypad). The CMS$_O$ responds with an NCS "CRCX" message that indicates that a connection is to be created. The TM$_O$ responds to the CMS$_o$ with an NCS "OK" message indicating that everything has been received by the CPE$_O$. As a result of this messaging, the CPE$_O$ and CMS$_O$ have established that the CMS$_o$ has the correct calling digits for the call.

After the three-way call initiation handshake, the CMS$_O$ then determines whether the SIP-UA$_O$ is authorized to call SIP-UA$_T$. In one implementation, the CMS$_O$ accomplishes this by sending an NCS "Gate-Alloc" message (1) to the HE$_O$, which responds with an acknowledgement indicating that the SIP-UA$_O$ is authorized. The CMS$_O$ then sends a "Gate-Set" message (2) to the HE$_T$ to transfer call handling to the other CMS$_T$. (Of course, this messaging may be skipped if the same CMS and HE are used by both User Agents.) This NCS message (2) also indicates a gate identifier (obtained from the CRCX message) to be used for later reservation of quality of service (QoS). The TM$_T$ receives this gate identifier (in an CRCX or a create connection message from the CMS$_T$) and informs the SIP-UA$_T$ that it has an incoming call by sending an SIP "INVITE" message (b). This SIP "INVITE" message (b) contains a session descriptor, which describes particular requirements of the originator such as an audio compression scheme. The SIP-UA$_T$ responds with an SIP "183 SDP" message (c) that specifies particular requirements of the terminator, such as the type of audio compression scheme. The SIP-UA$_T$ also sends an SIP "Ring" message (d) to the TM$_T$ that indicates that the SIP-UA$_T$'s associated phone is now ringing.

The TM$_T$ then participates in messaging with the HE$_T$ to provision services. For example, the HE$_T$ ensures that the SIP-UA$_T$'S phone sound is optimum and that traffic timing is set up. The originator TM$_O$ also initiates set up of network resources or services with its respective HE$_O$. To illustrate, the TM$_O$ sends an NCS "DSA-REQ" message (3) to the HE$_O$ to reserve network resources or services. The HE$_O$ acknowledges the request with a "DSA-RSP" message (4), which the TM$_O$ acknowledges with an NCS "DSA-ACK" message (5).

The $HE_O$ then sends to the $TM_O$ an NCS "DSC-REQ" message (6) requesting that the reserved services be committed. The $TM_O$ then indicates commitment of such services with an NCS "DSC-RSP" message (7), to which the $HE_o$ acknowledges with an NCS "DSC-ACK" message (8). After the terminator $TM_T$ and $HE_T$ also perform such service provisioning messaging, services are ready for use by the call.

In parallel to or after the service provisioning, the $TM_T$ sends an acknowledgement "OK" message to the $CMS_O$ in response to the previously received "CRCX" message. The $CMS_O$ then sends a second "Gate-Set" message (2) to the $HE_o$ to authorize it to admit the new connection After the $HE_o$ responds to the $CMS_O$ with an acknowledgement, the $CMS_o$ sends messaging information in the form of an "MDCX" (modify connection) message to the $TM_O$. The $TM_o$ then sends an SIP acknowledgement message (e) to the $SIP\text{-}UA_O$. indicating the $SIP\text{-}UA_T$'s audio compression scheme (which was obtained via the "MDCX" message, "Gate-Set" message (2), and the "200 OK" message from the $TM_T$).

After service set up is complete and the $TM_O$ receives an "DSC-ACK" message (8), the $TM_O$ sends an SIP "Ring" message (f) to the $SIP\text{-}UA_O$ to provide local or remote ringback. Ringback is generally defined as the messaging tone produced by the calling client's application indicating that a called party is being alerted (by ringing). The $TM_O$ also sends an SIP message (200 Ok) to the $CMS_O$ indicating that the local ringback has been accomplished. The $CMS_O$ forwards this message to the $CMS_T$, which sends a "RQNT (ring)" message to the $TM_T$. The "RQNT" message generally indicates that the receiver, e.g., $SIP\text{-}UA_T$, is to inform the $CMS_T$ when a particular event is to occur, e.g., a ring occurs. The $TM_T$ sends an acknowledgement message to the $CMS_T$.

When the user associated with $SIP\text{-}UA_T$ picks up their phone (e.g., in response to it ringing), the SIP-UA sends an "200 OK" message to the $TM_T$. In other words, the user has accepted the call from the user associated with the $SIP\text{-}UA_O$. The $TM_T$ translates the "200 OK" message into a "NTFY (offhook)" event message, which is sent to the $CMS_T$. Each TM proceeds to participate with other NCS components to perform routine call setup operations, such as accounting for billing for the call, bringing up some QoS, obtaining the appropriate bandwidth for the call, tracking the call's billing time, optimizing the call's sound quality, etc. During these routine call setup operations, the $TM_O$ sends an SIP "200 OK" message to the $SIP\text{-}UA_O$ to indicate that the other user has accepted the call. This "OK" message may be triggered off either the "MDCX" (modify connection) message received into the $TM_O$, the "DSC-REQ" message output from the $TM_O$, the "DSC-RSP" message received into the $TM_O$, or the "DSC-ACK" output from the $TM_O$.

When the $TM_T$ receives an "MDCX" message from the $CMS_T$, the $TM_T$ sends an "ACK" message (j) to the $SIP\text{-}UA_T$. The call is thereafter in progress with end-to-end (Service Level Agreement) SLA QoS. End-to-end SLA QoS entails data bandwidth reservations not only between the CPE and the HE but also across the WAN for the VOIP call. After a user hangs up, call termination messaging commences. As shown, the user associated with the $SIP\text{-}UA_O$ hangs up first and an SIP "BYE" message (k) is subsequently sent from the $SIP\text{-}UA_O$ to the $TM_O$. The $TM_O$ translates this SIP "BYE" message (k) into an NCS "NTFY (onhook)" message and sends it to the $CMS_T$ via the $CMS_O$. The $CMS_T$ deletes the connection by sending an NCS "DLCX" (delete connection) message to the $TM_T$. The $TM_T$ then translates this NCS "DLCX" message into an SIP "BYE" message (l) which is sent to the $SIP\text{-}UA_T$. Similar to the NCS "DLCX" message, the SIP "BYE" message (l) indicates termination of the call. The $SIP\text{-}UA_T$ thereafter acknowledges the termination (SIP "BYE" message) by sending an SIP "200 OK" message (m) to the $TM_T$.

On the originator side, the $CMS_O$ sends a corresponding NCS "DLCX" message to the $TM_O$. In response to their respective "DLCX" messages, both CMS's proceed to initiate shut down of their respective services by sending an NCS "DSD-REQ" (dynamic service deletion) message (e.g., 16) to their respective HE. The $HE_O$ and $HE_T$ both send an NCS "QoS Stop" message (e.g., 17) to the RKS server to stop billing of the service. Each HE also sends an NCS "DSD-RSP" message (e.g., 19) to their respective TM's to acknowledge the deletion of service request. The $TM_O$ also sends a last "200 OK" message (n) to the $SIP\text{-}UA_O$ to indicate acknowledgement of its previous "BYE" message (k). The call is now terminated between the respective users of $SIP\text{-}UA_O$ and $SIP\text{-}UA_T$.

Figure 3:
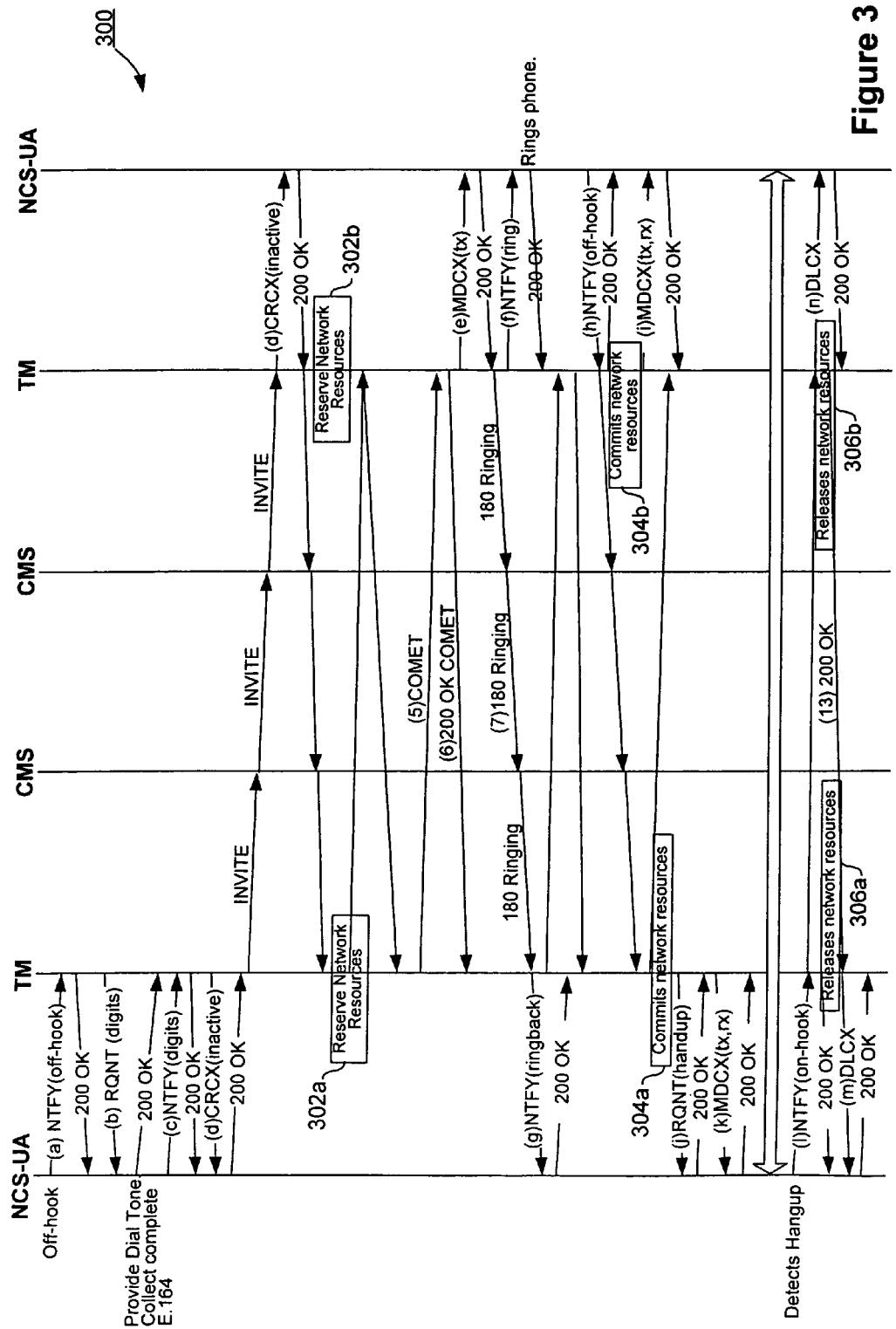
FIG. 3 is a communication diagram showing an example procedure for translating between the SIP and the NCS messages used for establishing and dismantling a particular call, where NCS is implemented by the User Agents of such call, in accordance with one embodiment of the present invention.

In another embodiment, the translation mechanisms ($TM_o$ and $TM_T$) are each configured to translate between corresponding data sent between an NCS-UA and another SIP component. FIG. 3 is a communication diagram 300 showing an example translation scheme for going between SIP and NCS at the respective customer premises equipment (CPE), where NCS is implemented by the user agent, in accordance with an alternative embodiment of the present invention. The subscript "O" correlates with the originator of the call, and the subscript "T" correlates with the terminations of such call. Different SIP messages are distinguished by different numeric symbols, and different NCS messages are distinguished by different alphabetic symbols.

Initially, a first user initiates a call through an $NCS\text{-}UA_O$ using an NCS "NTFY(off-hook)" message (a). This message is received in a $TM_O$. The $TM_O$ sends a "200 OK" message to acknowledge the off-hook message (a). The $TM_O$ also sends an "RQNT(digits)" message (b) indicating that the $NCS\text{-}UA_o$ should notify the $TM_O$ when digits are pressed (e.g., on the phone keypad). The $NCS\text{-}UA_O$ then notifies the $TM_O$ when the user does key in digits in the phone (e.g., physical or soft phone keypad) by sending an NCS "NTFY (digits)" message (c) to the $TM_O$. The $TM_O$ acknowledges the "NTFY" message by sending an NCS "200 OK" message to the $NCS\text{-}UA_O$. The $TM_O$ also sends an NCS "CRCX (inactive)" message (d) indicating creation of a connection to the $NCS\text{-}UA_O$, which the $NCS\text{-}UA_O$ acknowledges with an NCS "200 OK" message.

To establish the call with the other NCS-UA, the $TM_O$ sends an SIP "INVITE" message (1) to the other $TM_T$ through $CM_O$ and $CM_T$. The other $TM_T$ translates this SIP "INVITE" message into an NCS "CRCX(inactive)" message (d) to create a connection for the call and sends it to the $NCS\text{-}UA_T$. The $NCS\text{-}UA_T$ acknowledges the "CRCX" message (d) with an NCS "200 OK" message.

In other embodiments, the "INVITE" message (1) may include preconditions that must be met for the call. In this case, the $TM_T$ then sends a SIP "183 Session Progress with SDP" message to the $CMS_T$ to indicate its willingness to comply with the preconditions, along with descriptors for the session. This message (2) with the session descriptor (e.g., SDP) is then passed on to the $TM_O$ via the $CMS_O$. The $TM_O$ and $TM_O$ then each reserve services for the call in operation 302a and 302b. For example, the "DSA" messages that were discussed above in relation to FIG. 2 may be sent between each TM and CMS.

In some embodiments, reliability mechanisms may also be provided. In one implementation of SIP, reliability is provided for "provisional" responses. Provisional responses generally include responses that convey information, such as the "SDP" message (2). When a reliability mechanism is provided, the "SDP" response (2) includes a randomly selected sequence number (in an RSeq header field). The initiating $TM_O$ then acknowledges the SDP message (2) with an SIP "PRACK" message (3) having a sequence number equal to the SDP message's sequence number incremented by one. The other $TM_T$ will continue to retransmit the SDP message (2) until it receives a "PRACK" message having a correct sequence number. After a correctly sequenced "PRACK" message (3) is received by the $TM_T$, it then sends a "200 OK PRACK" message (4). This reliability mechanism may be easily incorporated into the implementation described above with relation to FIG. 2.

The $TM_O$ also sends an SIP "COMET" message (5) to indicate compliance with the preconditions. The $TM_T$ then acknowledges the COMET message (5) by sending a "200 OK COMET" message (6). The $TM_T$ then sends a "MDCS (tx)" message (e) to the NCS-UA$_T$ to indicate modification of the connection, and in response the NCS-UA$_T$ sends a "200 OK" message. The $TM_T$ then sends a "NTFY(ring)" message (f) to indicate a ring event, and the NCS-UA$_T$ acknowledges with a "200 OK" message. The $TM_T$ also translates the "NTFY" message (f) into a SIP "180 Ringing" message (7) sent to the other $TM_O$. The other $TM_O$ then sends an NCS "NTFY(ringback)" message (g) to the other NCS-UA$_O$. The other $TM_O$ may also send a "PRACK" message (8) to $TM_T$ in response to the provisional "180 Ringing" message (7), to which the $TM_T$ responds with a "200 OK PRACK" message (9).

When an off-hook event occurs at the NCS-UA$_T$, a "NTFY(off-hook)" message (h) is sent to the $TM_T$. The $TM_T$ acknowledges with a "200 OK" sent back to the NCS-UA$_T$. The $TM_T$ also sends a "200 OK" message (10) to the other $TM_O$, which is acknowledged by an "ACK" message (11). $TM_T$ and $TM_O$ also each commit network resources in operations 304a and 304b, respectively, that were previously reserved in operations 302a and 302b. For example, "DSC" type messages as described above with respect to FIG. 2 are sent between each TM and CMS pair. After resources are committed, each TM also sends a "MDCX" message (k) and (i) to their respective NSC-UA's. Each TM may also request notification of a hangup event (e.g., RQNT(hangup) message (j)). The call then proceeds.

When the user associated with this call and NCS-UA$_O$ hangs up, this event is detected and a "NTFY(on-hook)" message (1) is then sent from the NCS-UA$_O$ to the $TM_O$ to indicate the hang-up event. The $TM_O$ then translates this message (1) into an SIP "BYE" message (12) which is sent to the $TM_T$. Each TM releases the network resources in operations 306a and 306b. For example, "DSD" messages are sent between each TM and CMS pair as described above with relation to FIG. 2. Each TM sends a "DLCX" message (i.e., message m and n) to their respective NSC-UA's to indicate deletion of the connection and termination of the call.

Generally, the translation technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention may be implemented on a general-purpose programmable machine selectively activated or reconfigured by a computer program stored in memory. One important class of device that may be used to implement the present invention is the cable modem, or any other suitable type of customer premises equipment.

Figure 4:
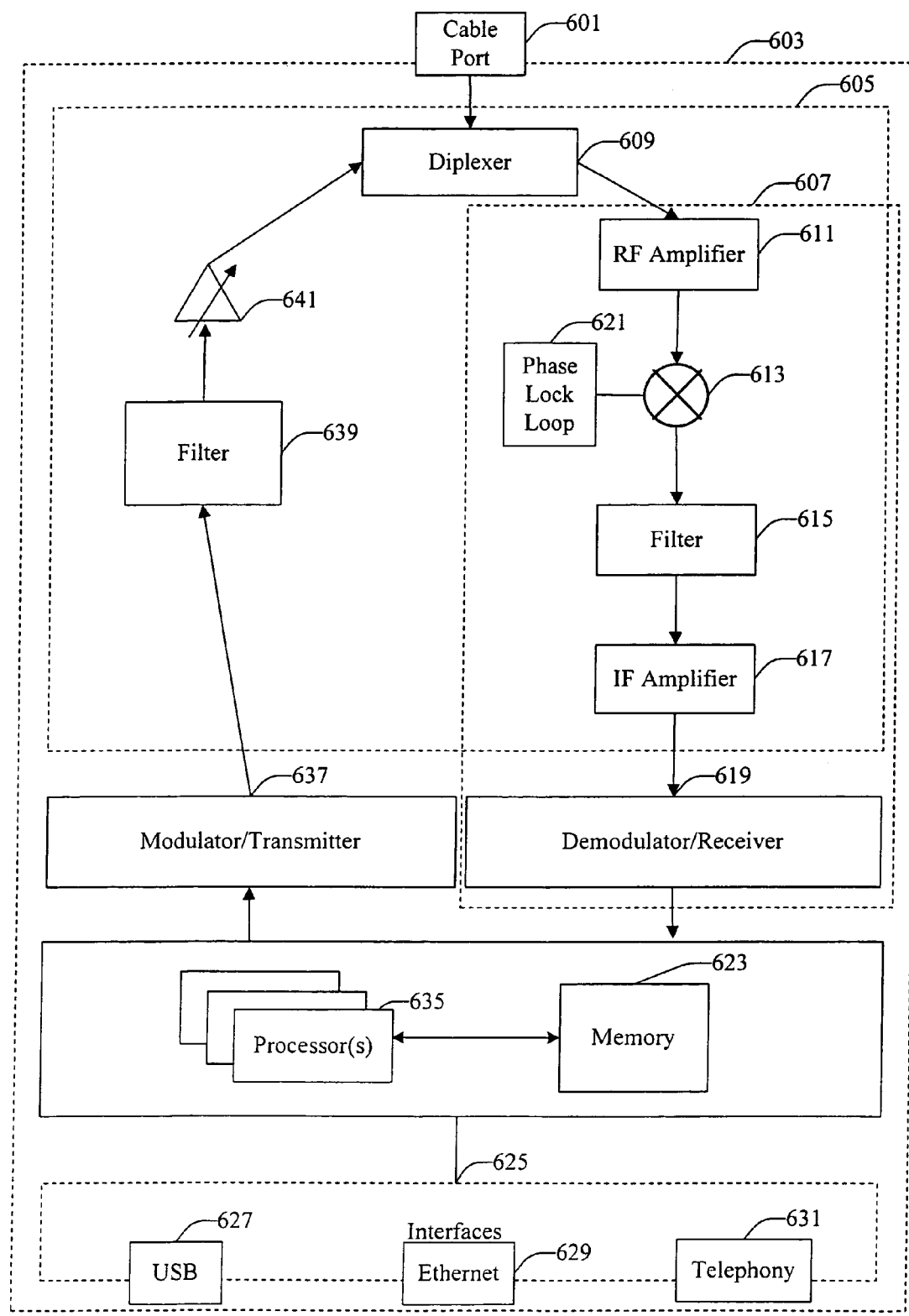
FIG. 4 is a diagram showing the components of a cable modem, according to specific embodiments.

FIG. 4 illustrates the components of a cable modem and receiver circuitry suitable for implementation of some or all of the translation mechanisms of the present invention. In the illustrated embodiment, the cable modem 603 also has a cable port 601 to connect the cable modem with a head end. It also has a tuner 605, modulator 637, demodulator 619, processors including VOIP DSPs in 635, memory 623, and USB 627, Ethernet 629, or telephony 631 ports to connect the cable modem to client hardware. It should be noted that multiple components of a cable modem may be contained in a single integrated circuit, or may be a combination of digital and analog circuitry.

Tuner 605 typically includes an upstream circuit for transmitting data to a head end and a downstream circuit for receiving data from the head end. The tuner can accommodate both functions through a diplexer connected to a single cable port. Downstream data sent to the cable modem from a head end is amplified using an RF amplifier 611. RF amplifier 611 is connected to a mixer 613 coupled with a phase lock loop 621. The phase lock loop 621 coupled with the mixer 613 selects a channel and converts the RF signal into an IF signal. The IF signal is passed through a filter 615 and amplified by an IF amplifier 617. The IF signal is introduced into a demodulator/receiver 619. The demodulator/receiver 619 contains components for analog to digital conversion, demodulation, frame synchronization, and error correction.

The downstream data transmission is then passed to processors 635 connected to memory 623. Processors 635 may include general purpose CPUs or special purpose DSPs. According to specific embodiments, the processors 635 encapsulate and decapsulate packets within a MAC header, preferably according to the above-mentioned DOCSIS standard for transmission of data or other information. The encapsulation and decapsulation can be performed by processors 635 coupled with memory 623 or by special purpose MAC hardware. The processors may also be configured to decrypt or descramble encrypted or scrambled data. The processors are also configured to perform one or more techniques of the present invention, such as translating communication messages between two different protocols. The transmission is then passed onto the downstream interface 625 comprising ports supporting protocols and standards such as USB, PCI, Ethernet, and telephony. The downstream interface 624 may be coupled to any suitable client, such as a computer or television system.

A client wishing to send data upstream through the cable modem does so through interface 625. The packets are processed and encapsulated by processors 635 coupled with memory 623 and passed to the upstream modulator/transmitter 637. The processors 635 can also time the transmissions of the upstream bursts. The modulator/transmitter encodes the data, modulates the data onto a selected frequency, and converts the signal from digital to analog. The signal is filtered at 639 and passed on to a variable reverse amplifier 641 before transmitting the signal through diplexer 609 onto the cable network.

The transmitter circuitry of the cable modem typically has variable reverse amplifier 641, filter 639, and the modulator/transmitter 637. Cable modems typically have enable and disable functionality for transmitter circuitry. The transmit enable and disable states allow the cable modem to put the transmitter circuitry in standby mode, so that the cable modem consumes less power when no data needs to be transmitted to the head end. The processors 635 may also be configured to transmit translated data to other cable network components.

Receiver circuitry 607 of the cable modem contains RF amplifier 611, phase lock loop 621, mixer 613, filter 615, and IF amplifier 617. Receiver circuitry 607 can additionally comprise processors, memory, and MAC hardware. According to specific embodiments, the receiver circuitry may be configured to implement one or more techniques of the present invention, such as translating between messages sent between an SIP User Agent and another NCS cable network cable component. The receiver circuitry may also be configured to receive and store communication data from other cable network components in a first protocol and then translate such data into another protocol.

Although the foregoing invention has been described in some detail for purposes of clarity of understanding, it will be apparent that certain changes and modifications may be practiced within the scope of the appended claims. For example, although the present invention is only described in terms of translating between SIP and NCS, the translation techniques may easily be modified for different communication protocols. Therefore, the described embodiments should be taken as illustrative and not restrictive, and the invention should not be limited to the details given herein but should be defined by the following claims and their full scope of equivalents.

What is claimed is:

1. A method for translating communication data within a call endpoint system in a cable network, comprising:
   within a first call endpoint system, receiving a first data sent by a first user agent to a second user agent, the first data using a first communication protocol, the first user agent being part of the first call endpoint system and the second user agent being part of a second call endpoint system; and
   within the first call endpoint system, initiating one or more second data transaction(s) with one or more intermediary cable components within the cable network based on such first data, the second data using a second communication protocol that is also utilized by the one or more cable components, the one or more intermediary cable components being configured to send one or more third data based on the second data or other data sent by the first agent to the second user agent,
   wherein one of the first or second call endpoint systems is an originator of a particular call and the other of the first and second call endpoint system is a terminator of the particular call, and the first and second data forms part of the particular call, wherein each of the first and second call endpoint systems includes a device for receiving audio input.

2. A method as recited in claim 1, wherein the first protocol is Session Initiation Protocol (SIP) and the second protocol is the Network-based Call Signaling (NCS) protocol.

3. A method as recited in claim 2, wherein the first data is an INVITE message and the second data transaction(s) includes a NTFY(digits) message.

4. A method as recited in claim 2, wherein the first data is a BYE message and the second data transaction(s) includes a NTFY(OnHook) message.

5. A method as recited in claim 2, wherein the first data is an "183 SDP" message and the second data transaction(s) includes a DSA-REQ message.

6. A method as recited in claim 1, wherein the first protocol is Network-based Call Signaling (NCS) protocol and the second protocol is Session Initiation Protocol (SIP).

7. A method as recited in claim 1, wherein the first user agent is configured within a first customer premises equipment (CPE) and the second user agent is configured within a second CPE, the one or more other cable components including a call management server.

8. A method as recited in claim 1, further comprising:
   within the first call endpoint system, receiving a fourth data sent from the one or more intermediary cable components to the first user agent, the fourth data using the second protocol;
   within the first call endpoint system, when the fourth data requires a response, sending a response to the one or more intermediary cable components, the response using the second protocol; and
   within the first call endpoint system, initiating one or more fifth data transaction(s) with the first user agent based on the fourth data, the fifth data using the first protocol.

9. A method as recited in claim 8, wherein the first protocol is Session Initiation Protocol (SIP) and the second protocol is the Network-based Call Signaling (NCS) protocol.

10. A method as recited in claim 9, wherein the fourth data is a CRCX message and the fifth data transaction(s) includes an INVITE message.

11. A method as recited in claim 9, wherein the fourth data is an MDCX message and the fifth data transaction(s) includes an "183 SDP" message.

12. A method as recited in claim 9, wherein the fourth data is an DSC-ACK message and the fifth data transaction(s) includes an "180 Ring" message.

13. A method as recited in claim 9, wherein the fourth data is an DSD-RSP message and the fifth data transaction(s) includes an "200 OK" message when the first user agent has previously sent a BYE message.

14. A method as recited in claim 1, wherein each of the first and second call endpoint systems further includes a customer premise equipment (CPE).

15. A method as recited in clam 14, wherein each device for receiving audio input is a telephone and each CPE is in the form of a set top box or a cable modem.

16. A method as recited in clam 15, wherein at least one of the telephones of the first and second endpoint systems is a soft telephone within a computer system.

17. A computer system operable to translate communication data within a call endpoint system of a cable network, the computer system comprising:
   one or more processors;
   one or more memory, wherein at least one of the processors and memory are adapted to within a first call endpoint system:
   receive a first data sent by a first user agent to a second user agent, the first data using a first communication protocol, the first user agent being part of the first call endpoint system and the second user agent being part of a second call endpoint system; and
   initiate one or more second data transaction(s) with one or more intermediary cable components within the cable network based on such first data, the second data using a second communication protocol that is also utilized by the one or more cable components, the one or more intermediary cable components being configured to send one or more third data based on the second data or other data sent by the first agent to the second user agent, wherein one of the first or second call endpoint systems is an originator of a particular call and the other of the first and second call endpoint system is a terminator of the particular call, and the first and second data forms part of the particular call, wherein each of the first and second call endpoint systems includes a device for receiving audio input.

18. A computer system as recited in claim 17, wherein the first protocol is Session Initiation Protocol (SIP) and the second protocol is the Network-based Call Signaling (NCS) protocol.

19. A computer system as recited in claim 18, wherein the first data is an INVITE message and the second data transaction(s) includes a NTFY(digits) message.

20. A computer system as recited in claim 18, wherein the first data is a BYE message and the second data transaction(s) includes a NTFY(OnHook) message.

21. A computer system as recited in claim 18, wherein the first data is an "183 SDP" message and the second data transaction(s) includes a DSA-REQ message.

22. A computer system as recited in claim 17, wherein the first protocol is Network-based Call Signaling (NCS) protocol and the second protocol is Session Initiation Protocol (SIP).

23. A computer system as recited in claim 17, wherein the first user agent is configured within a first customer premises equipment (CPE) and the second user agent is configured within a second CPE, the one or more other cable components including a call management server, wherein the computer system forms part of the first CPE.

24. A computer system as recited in claim 17, wherein the one or more memory, wherein at least one of the processors and memory are further adapted to within the first call endpoint system:

receive a fourth data sent from the one or more intermediary cable components to the first user agent, the fourth data using the second protocol;

when the fourth data requires a response, send a response to the one or more intermediary cable components, the response using the second protocol;

initiate one or more fifth data transaction(s) with the first user agent based on the fourth data, the fifth data using the first protocol.

25. A computer system as recited in claim 24, wherein the first protocol is Session Initiation Protocol (SIP) and the second protocol is the Network-based Call Signaling (NCS) protocol.

26. A computer system as recited in claim 25, wherein the fourth data is a CRCX message and the fifth data transaction(s) includes an INVITE message.

27. A computer system as recited in claim 25, wherein the fourth data is an MDCX message and the fifth data transaction(s) includes an "183 SDP" message.

28. A computer system as recited in claim 25, wherein the fourth data is an DSC-ACK message and the fifth data transaction(s) includes an "180 Ring" message.

29. A computer system as recited in claim 25, wherein the fourth data is an DSD-RSP message and the fifth data transaction(s) includes an "200 OK" message when the first user agent has previously sent a BYE message.

30. A computer system as recited in clam 17, wherein each of the first and second call endpoint systems further includes a customer premise equipment (CPE).

31. A computer system as recited in clam 30, wherein each device for receiving audio input is a telephone and each wherein the CPE is in the form of a set top box or a cable modem.

32. A computer system as recited in clam 31, wherein at least one of the telephones of the first and second endpoint systems is a soft telephone within a computer system.

33. A computer program product for translating communication data within a call endpoint system in a cable network, the computer program product comprising:

at least one computer readable medium;

computer program instructions stored within the at least one computer readable product configured to:

within a first call endpoint system, receive a first data sent by a first user agent to a second user agent, the first data using a first communication protocol, the first user agent being part of the first call endpoint system and the second user agent being part of a second call endpoint system; and within the first call endpoint system, initiate one or more second data transaction(s) with one or more intermediary cable components within the cable network based on such first data, the second data using a second communication protocol that is also utilized by the one or more cable components, the one or more intermediary cable components being configured to send one or more third data based on the second data or other data sent by the first agent to the second user agent, wherein one of the first or second call endpoint systems is an originator of a particular call and the other of the first and second call endpoint system is a terminator of the particular call, and the first and second data forms part of the particular call, wherein each of the first and second call endpoint systems includes a device for receiving audio input.

34. A computer program product as recited in claim 33, wherein the first protocol is Session Initiation Protocol (SIP) and the second protocol is the Network-based Call Signaling (NCS) protocol.

35. A computer program product as recited in claim 33, wherein the first protocol is Network-based Call Signaling (NCS) protocol and the second protocol is Session Initiation Protocol (SIP).

36. A computer system program product as recited in claim 33, wherein the first user agent is configured within a first customer premises equipment (CPE) and the second user agent is configured within a second CPE, the one or more other cable components including a call management server.

37. A computer program product as recited in claim 33, wherein the computer program instructions stored within the at least one computer readable product are further configured to within the first call endpoint system:

receive a fourth data sent from the one or more intermediary cable components to the first user agent, the fourth data using the second protocol;

when the fourth data requires a response, send a response to the one or more intermediary cable components, the response using the second protocol;

initiate one or more fifth data transaction(s) with the first user agent based on the fourth data, the fifth data using the first protocol.

38. An apparatus for translating communication data within a call endpoint system in a cable network, the apparatus comprising:
  means for receiving a first data sent by a first user agent to a second user agent, the first data using a first communication protocol; and
  means for initiating one or more second data transaction(s) with one or more intermediary cable components within the cable network by translating the first protocol of the first data to a second protocol of the second data, the second communication protocol being also utilized by the one or more cable components, the one or more intermediary cable components being configured to send one or more third data based on the second data or other data sent by the first agent to the second user agent, wherein the call endpoint system in which translation occurs includes a device for receiving audio input.

39. An apparatus as recited in claim 38, wherein the first protocol is Session Initiation Protocol (SIP) and the second protocol is the Network-based Call Signaling (NCS) protocol.

40. An apparatus as recited in claim 39, further comprising:
  means for receiving a fourth data sent from the one or more intermediary cable components to the first user agent, the fourth data using the second protocol;
  means for when the fourth data requires a response, sending a response to the one or more intermediary cable components, the response using the second protocol; and
  means for initiating one or more fifth data transaction(s) with the first user agent based on the fourth data, the fifth data using the first protocol.

* * * * *